United States Patent [19]
Shimada et al.

[11] Patent Number: 5,865,707
[45] Date of Patent: Feb. 2, 1999

[54] SHIFT CONTROL METHOD FOR AN AUTOMATIC TRANSMISSION BASED UPON SLIPPAGE RATES OF ENGAGEMENT ELEMENTS

[75] Inventors: Takamichi Shimada, Sakado; Noboru Sekine, Kasukabe, both of Japan

[73] Assignee: Honda Giken Kogyo Kabushiki Kaisha, Tokyo, Japan

[21] Appl. No.: 775,924

[22] Filed: Jan. 2, 1997

[30] Foreign Application Priority Data

Jan. 8, 1996 [JP] Japan .................................. 8-000391

[51] Int. Cl.$^6$ .................................................. F16H 61/08
[52] U.S. Cl. ................................ 477/44; 477/43; 701/60
[58] Field of Search .................................... 477/143, 144, 477/148, 149, 156, 120; 701/60

[56] References Cited

U.S. PATENT DOCUMENTS

| | | | |
|---|---|---|---|
| 4,796,490 | 1/1989 | Butts et al. | 477/148 |
| 5,038,636 | 8/1991 | Vukovich et al. | 477/144 X |
| 5,046,174 | 9/1991 | Lentz et al. | 477/144 X |
| 5,113,343 | 5/1992 | Hunter et al. | 477/149 X |
| 5,211,079 | 5/1993 | Runde et al. | 477/148 X |
| 5,370,016 | 12/1994 | Fujita et al. | 701/60 X |

FOREIGN PATENT DOCUMENTS 62-246653 10/1987 Japan .
6-8665 2/1994 Japan .

*Primary Examiner*—Charles A. Marmor
*Assistant Examiner*—Ankur Parekh
*Attorney, Agent, or Firm*—Nikaido, Marmelstein, Murray & Oram LLP

[57] ABSTRACT

A shift control for a shift-down operation is executed by carrying out the following stages in order: an off-going range releasing stage STO1 which quickly lowers the engagement actuation pressure of the off-going engaging element to an engagement-releasing pressure; an off-going range controlling stage STO2, STO3 and STO4 which sets the engagement actuation pressure of the off-going engaging element to a pressure a little higher than the engagement-releasing pressure; an on-coming range void-stroke-clearing stage STR1 which sets the engagement actuation pressure of the on-coming engaging element to a predetermined high-pressure necessary for clearing the void stroke; an on-coming range waiting stage STR2 and STR3 which sets the engagement actuation pressure of the on-coming engaging element to a stand-by pressure necessary for retaining the on-coming engaging element in stand-by condition prior to engagement; an off-going range final stage which releases the off-going engaging element completely; and an on-coming range final stage which engages the on-coming engaging element completely.

10 Claims, 11 Drawing Sheets

SHIFT CONTROL METHOD FOR AN AUTOMATIC TRANSMISSION BASED UPON SLIPPAGE RATES OF ENGAGEMENT ELEMENTS

FIELD OF THE INVENTION

The present invention relates generally to an automatic transmission such as used in a vehicle and particularly to a shift control method which controls the engagement actuation pressures (engaging force) of off-going and on-coming engaging elements during a shift-down operation.

BACKGROUND OF THE INVENTION

Automatic transmissions are composed of a plurality of gear trains. For the purpose of shifting speed ranges, these gear trains establish a plurality of power transmission paths, and these transmission paths are selected through some engaging elements such as clutches and brakes, which are actuated hydraulically. While the transmission is being shifted, an engaging element establishing the power transmission path for an off-going speed range (off-going engaging element) is released, and another element (on-coming engaging element) is engaged to establish the power transmission path for an on-coming speed range.

In order to execute such shifts smoothly without any lag, the engagement and disengagement of the engaging elements are precisely timed, and forces applied to these engaging elements for engagement and disengagement are properly controlled. For example, Japanese Laid-Open Patent Publication No. 62(1987)-246653 discloses a following method. After a shift command is generated, while the engagement actuation pressure of the off-going engaging element is lowered to allow some slipping in the off-going engaging element, the on-coming engaging element is cleared of the void stroke. Then, the off-going engaging element is released while the on-coming engaging element is gradually brought into engagement. Thereafter, the actuation pressure of the on-coming engaging element is gradually increased.

Also, Japanese Patent Publication No. H6(1994)-8665 discloses a shift control method for carrying out a shift-down operation in power-on condition. In this control method, the engagement actuation pressure of the off-going engaging element is gradually lowered while the rotational speed of the turbine of the torque converter increases in response. Then, the engagement actuation pressure of the off-going engaging element is increased again to adjust this rotational speed to a target rotational speed suitable for the on-coming engaging element to engage, and the torque transmission path is switched from the off-going speed range to the on-coming speed range.

However, in this shift-down operation, if the off-going engaging element is released too quickly for the on-coming engaging element to follow up in engagement after the release of the off-going engaging element, a problem of shift shock or engine racing is experienced during the engaging of the on-coming engaging element at the end of the shift operation. On other hand, if the off-going engaging element is released too slowly, a problem of overheat or wear is experienced in the off-going engaging element because of a resultant, excessive time for slippage. Moreover, if the timing for engaging the on-coming engaging element is not controlled precisely in relation with the release of the off-going engaging element, a problem of shift shock or shift delay is likely to happen.

SUMMARY OF THE INVENTION

It is an object of the present invention to provide a shift control method for an automatic transmission which enables a smooth shift-down operation without any lag.

In order to achieve this objective, a power-on shift-down control method of the present invention comprises an off-going range releasing stage, an off-going range controlling stage, an on-coming range void- stroke- clearing stage, an on-coming range waiting stage, an off-going range final stage and an on-coming range final stage, and it executes these stages in order. During the off-going range releasing stage, a pressure command signal is generated to lower the engagement actuation pressure of the off-going engaging element quickly to an engagement-releasing pressure. During the off-going range controlling stage, a pressure command signal is generated to set the engagement actuation pressure of the off-going engaging element to a pressure a little higher than the engagement-releasing pressure. During the on-coming range void-stroke-clearing stage, a pressure command signal is generated to set the engagement actuation pressure of the on-coming engaging element to a predetermined high-pressure necessary for clearing the void stroke of the on-coming engaging element. During the on-coming range waiting stage, a pressure command signal is generated to set the engagement actuation pressure of the on-coming engaging element to a stand- by pressure necessary for retaining the on-coming engaging element in stand-by condition prior to engagement. During the off-going range final stage, a pressure command signal is generated to release the off-going engaging element completely. During the on-coming range final stag, a pressure command signal is generated to engage the on-coming engaging element completely.

In this shift control, control of the off-going engaging element based on the off-going range releasing stage is started after a shift-down command is generated. When the rate of slippage of the off-going engaging element increases to a first rate of slippage set for the off-going engaging element, the control of the off-going engaging element proceeds to a control based on the off-going range controlling stage, and control of the on-coming engaging element based on the on-coming range void-stroke-clearing stage is started. When the rate of slippage of the off-going engaging element increases to a second rate of slippage set for the off-going engaging element, the control of the on-coming engaging element proceeds to a control based on the on-coming range waiting stage. When the rate of slippage of the on-coming engaging element decreases to a rate of slippage set for engagement determination, which is almost zero, the control of the off-going engaging element proceeds to a control based on the off-going range final stage, and the control of the on-coming engaging element proceeds to a control based on the on-coming range final stage.

In a shift-down operation executed in power-on condition, when the off-going engaging element is released, the rotational speed of the engine increases rapidly because of the power-on condition. In this shift control, when the off-going engaging element starts slipping, i.e., when the rate of slippage of the off-going engaging element increases to the first rate of slippage set for the off-going engaging element, the off-going range controlling stage is executed to control the off-going engaging element so that the off-going engaging element shows an appropriate increase in slippage. Therefore, it is easy to engage the on-coming engaging element smoothly without any shift shock, achieving a smooth power-on shift-down operation.

Furthermore, in this control, the on-coming range void-stroke-clearing stage is executed at the same time when the off-going engaging element starts slipping. In addition, the on-coming engaging element is cleared of the void stroke so that it is in stand-by condition prior to engagement. Following this stage, the on-coming engaging element is easily engaged without any lag. This void stroke clearing is carried out by a command signal which sets a predetermined high pressure while the slippage of the on-coming engaging element is still large. Therefore, it is important to complete the clearing of the void stroke timely. Otherwise, a problem of shift shock may be experienced as the on-coming engaging element engages quickly. In the shift control method of the present invention, whether the void stroke has been cleared or not is judged from the rate of slippage of the off-going engaging element, so the completion of the void stroke clearing can be detected precisely.

The rate of slippage is calculated from the input/output rotational speed ratio of each engaging element. It is preferable to start control of the off-going engaging element based on the off-going range releasing stage after a first predetermined time period T1 has elapsed since the generation of the shift-down command. Furthermore, the timing for starting the control of the on-coming engaging element based on the on-coming range void-stroke-clearing stage may be determined from a time which has elapsed since the generation of the shift-down command instead of the rate of slippage of the off-going engaging element. Thus, the control of the on-coming engaging element based on the on-coming range void-stroke-clearing stage may be started when this elapsed time reaches a second predetermined time period T2.

In this shift control method of the present invention, the off-going range controlling stage can include a torque-increasing stage which increases gradually the engagement actuation pressure of the off-going engaging element from the engagement-releasing pressure and a feedback stage which controls in feedback the engagement actuation pressure of the off-going engaging element to match the rate of slippage increase of the off-going engaging element to a target rate of slippage increase. This target rate of slippage increase is set in correspondence with the rate of slippage of the off-going engaging element in such a way that if the rate of slippage is large, the target rate of slippage increase is set also large. In this case, when the rate of slippage of the off-going engaging element increases to the first rate of slippage set for the off-going engaging element, the control of the off-going engaging element proceeds to a control based on the torque-increasing stage. Then, when the rate of slippage of the off-going engaging element changes to the second rate of slippage set for the off-going engaging element, the control of the off-going engaging element proceeds to a control based on the feedback stage.

It is preferable that the feedback stage include a second feedback stage which controls in feedback the engagement actuation pressure of the off-going engaging element to attain a constant rate of slippage increase. This rate represents the target rate of slippage increase which is set in constant. When the rate of slippage of the on-coming engaging element decreases to a rate of slippage set for switching determination, the control of the off-going engaging element is switched to a control based on the second feedback stage. In this feedback control, a change in the rate of slippage of the off-going engaging element is set to a desirable value, so engaging the on-coming engaging element timely and smoothly is made easy.

Moreover, this shift control can include an on-coming range engaging stage which increases the engagement actuation pressure of the on-coming engaging element gradually from the stand-by pressure to a medium engagement pressure. In this case, when the rate of slippage of the on-coming engaging element decreases to a rate of slippage set for switching determination during the control of the on-coming engaging element based on the on-coming range waiting stage, the control of the on-coming engaging element is switched to a control based on the on-coming range engaging stage.

In this control, while the slippage of the on-coming engaging element becomes small toward engagement, the on-coming engaging element engages gradually. Thus, it is easy to engage the on-coming engaging element more timely and smoothly.

On the other hand, a power-off shift-down control method of the present invention comprises an off-going range releasing stage, an on-coming range void-stroke-clearing stage, an on-coming range waiting stage, an off-going range final stage and an on-coming range final stage. During the off-going range releasing stage, a pressure command signal is generated to quickly lower the engagement actuation pressure of the off-going engaging element to an engagement-releasing pressure. During the on-coming range void-stroke-clearing stage, a pressure command signal is generated to set the engagement actuation pressure of the on-coming engaging element to a predetermined high-pressure necessary for clearing the void stroke of the on-coming engaging element. During the on-coming range waiting stage, a pressure command signal is generated to set the engagement actuation pressure of the on-coming engaging element to an engagement pressure set correspondingly to an input torque. During the off-going range final stage, a pressure command signal is generated to release the off-going engaging element completely. During the on-coming range final stage, a pressure command signal is generated to engage the on-coming engaging element completely.

In this shift control method, after a shift-down command is generated, control of the off-going engaging element based on the off-going range releasing stage is started. When a predetermined time period T2 has elapsed since the generation of the shift-down command, control of the on-coming engaging element based on the on-coming range void-stroke-clearing stage is started. When the rate of slippage of the off-going engaging element increases to a predetermined rate of slippage set for the off-going engaging element, control of the on-coming engaging element based on the on-coming range waiting stage is started. When the rate of slippage of the on-coming engaging element decreases to a slippage rate set for engagement determination, which is almost zero, control of the off-going engaging element based on the off-going range final stage and control of the on-coming engaging element based on the on-coming range final stage are executed.

It is preferable to include an on-coming range engaging stage which increases the engagement actuation pressure of the on-coming engaging element gradually from a stand-by pressure. In this case, when the rate of slippage of the on-coming engaging element decreases to a rate of slippage set for switching determination during the control of the on-coming engaging element based on the on-coming range waiting stage, the control of the on-coming engaging element is switched to a control based on the on-coming range engaging stage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only and thus are not limitative of the present invention and wherein.

DETAILED DESCRIPTION OF THE PREFERRED EMBODIMENTS

Figure 1:
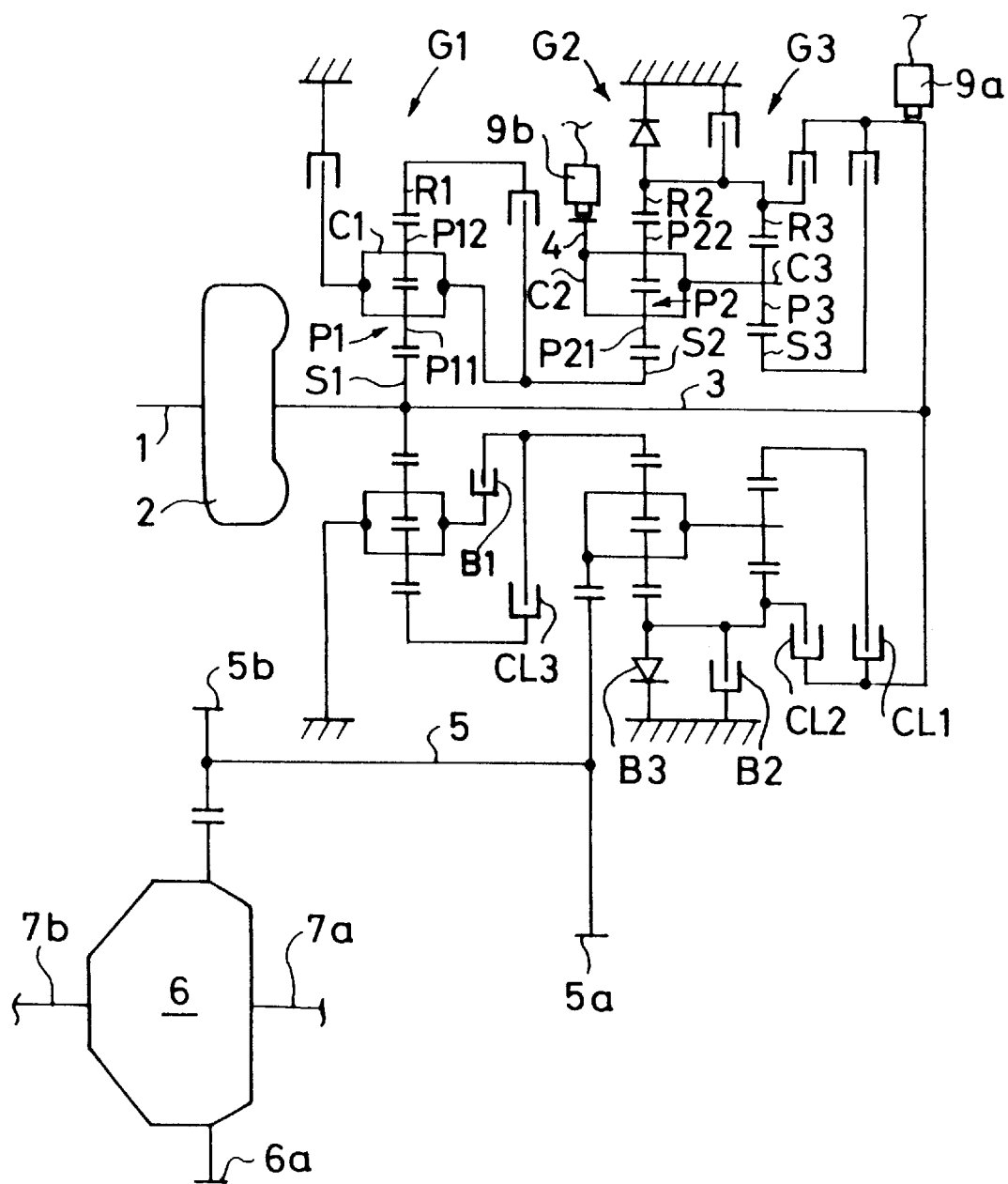
FIG. 1 is a schematic diagram of an automatic transmission which is controlled by a shift control method according to the present invention.

FIG. 1 shows a power transmission system for use in an automatic transmission which is controlled by a shift control method of the present invention.

This transmission comprises a torque converter 2 connected to an engine output shaft 1, an input shaft 3 connected to a turbine shaft of the torque converter 2, and a planetary transmission mechanism mounted on the input shaft 3.

The planetary transmission mechanism has first, second, and third planetary gear trains G1, G2 and G3 juxtaposed on the input shaft 3. The first, second, and third planetary gear trains comprise respective first, second, and third sun gears S1, S2 and S3 positioned centrally; respective first, second, and third planetary pinions P1, P2 and P3 in mesh with the first, second and third sun gears S1, S2 and S3, respectively, and revolving therearound while rotating about their own axes; respective first, second, and third carriers C1, C2 and C3 which support the respective planetary pinions P1, P2 and P3 rotatably and rotate therewith around the sun gears S1, S2 and S3, respectively; and respective first, second and third ring gears R1, R2 and R3, whose internal gear teeth mesh with the planetary pinions P1, P2 and P3, respectively.

The first and second planetary gear trains G1 and G2 are double-pinion planetary gear trains. The first and second pinions P1 and P2 comprise two pinions each P11 and P12, and P21 and P22, respectively.

The first sun gear S1 is connected to the input shaft 3 at all times, and the first carrier C1 is fixed and retained to a housing. This first carrier C1 is coupled to the second sun gear S2 through a first brake B1. The first ring gear R1 is engageably and disengageably coupled to the second sun gear S2 through a third clutch CL3. The second carrier C2 is coupled with the third carrier C3 at all times, and they are coupled to an output gear 4 at all times. The second ring gear R2 is coupled with the third ring gear R3 at all times, and they can be held against rotation by a second brake B2. Besides this second brake B2, they are also connected to the housing through a one-way brake B3, thus not rotatable in a forward drive direction. Furthermore, the second and third ring gears R2 and R3 are engageably and disengageably connected to the input shaft 3 through a second clutch CL2, and the third sun gear S3 is engageably and disengageably connected to the input shaft 3 through a first clutch CL1.

Furthermore, input and output rotation sensors 9a and 9b are provided as shown in the figure.

In the above described transmission, shifts of speed ranges are carried out by selectively engaging and disengaging the first, second and third clutches CL1, CL2 and CL3 and the first and second brakes B1 and B2. Specifically, five forward speed ranges (1ST, 2ND, 3RD, 4TH and 5TH) and one reverse speed range (REV) can be established by selectively engaging the clutches and brakes as indicated in Table 1 below.

In the table, the second brake B2 in the 1ST speed range is marked by a circle in parentheses to indicate that the 1ST speed range can be established by the one-way brake B3 with or without the engagement of the second brake B2. This means that when the first clutch CL1 is engaged, the 1ST speed range can be established without the engagement of the second brake B2. However, since the one-way brake B3 does not allow power transmission in the direction opposite to a forward drive direction, no engine brake is available in the 1ST speed range which is established without the engagement of the second brake B2. On the other hand, engine brake is available in the 1ST speed range if it is established with the engagement of the second brake B2. Thus, the 1ST speed range in the forward range D does not allow engine brake.

TABLE 1

| Speed range | CL1 | CL2 | CL3 | B1 | B2 |
|---|---|---|---|---|---|
| 1ST | ◯ | | | | (◯) |
| 2ND | ◯ | | | ◯ | |
| 3RD | ◯ | | ◯ | | |
| 4TH | ◯ | ◯ | | | |
| 5TH | | ◯ | ◯ | | |
| REV | | | ◯ | | ◯ |

Figure 2:
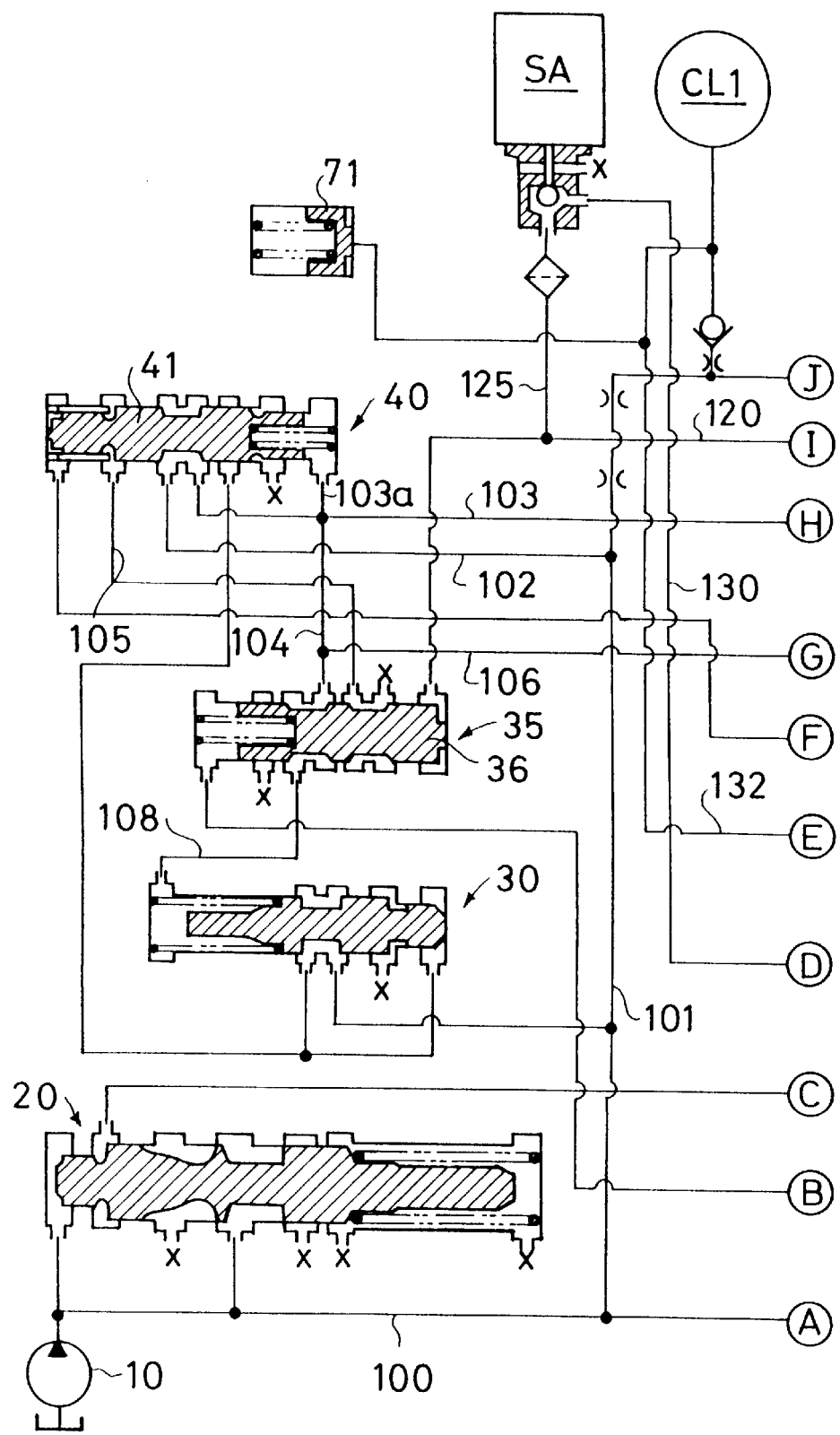
FIG. 2 is a partial hydraulic circuit diagram showing components of a shift control apparatus with which the shift control method is executed.
Figure 3:
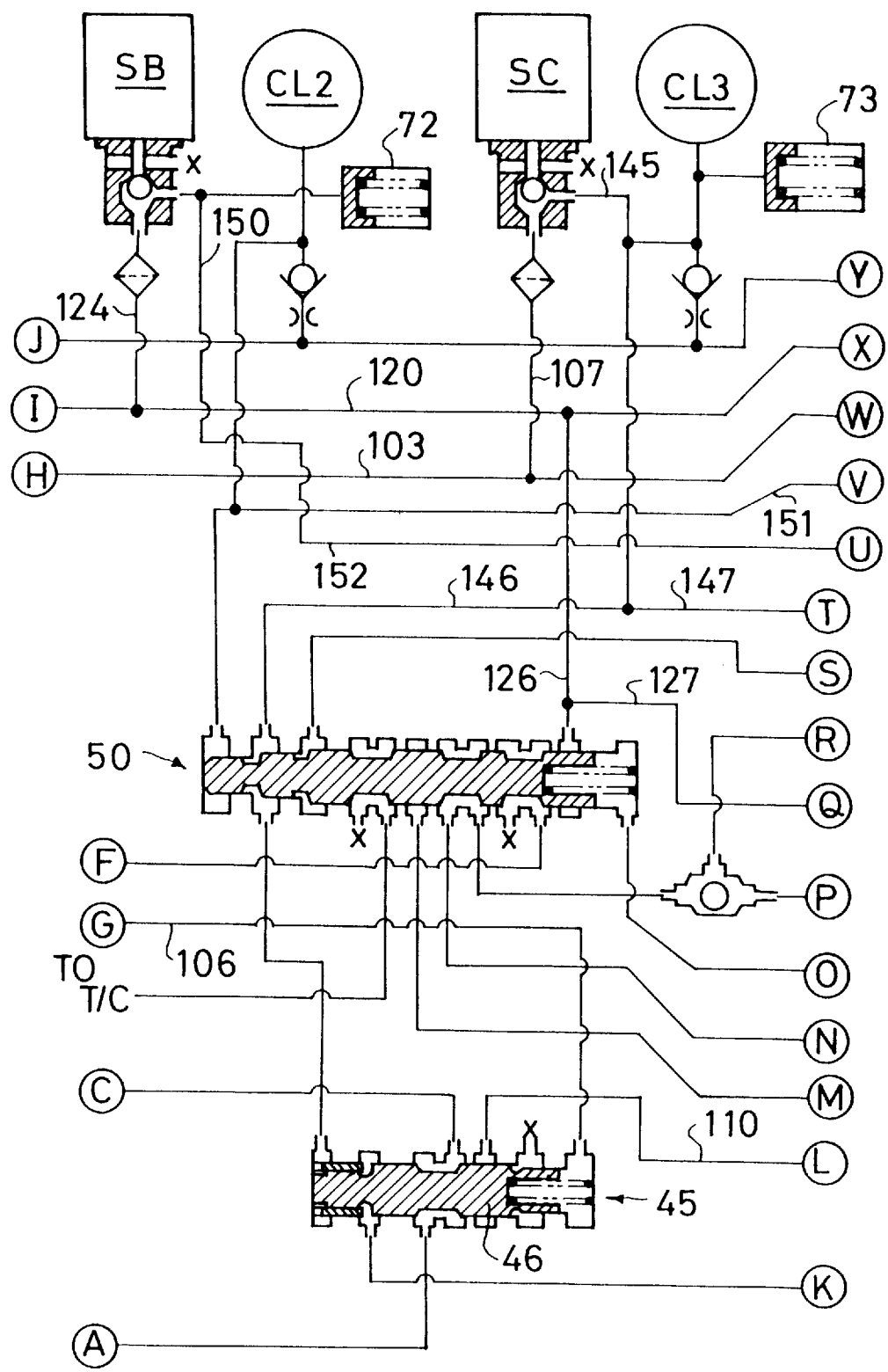
FIG. 3 is another partial hydraulic circuit diagram showing components of the shift control apparatus.
Figure 4:
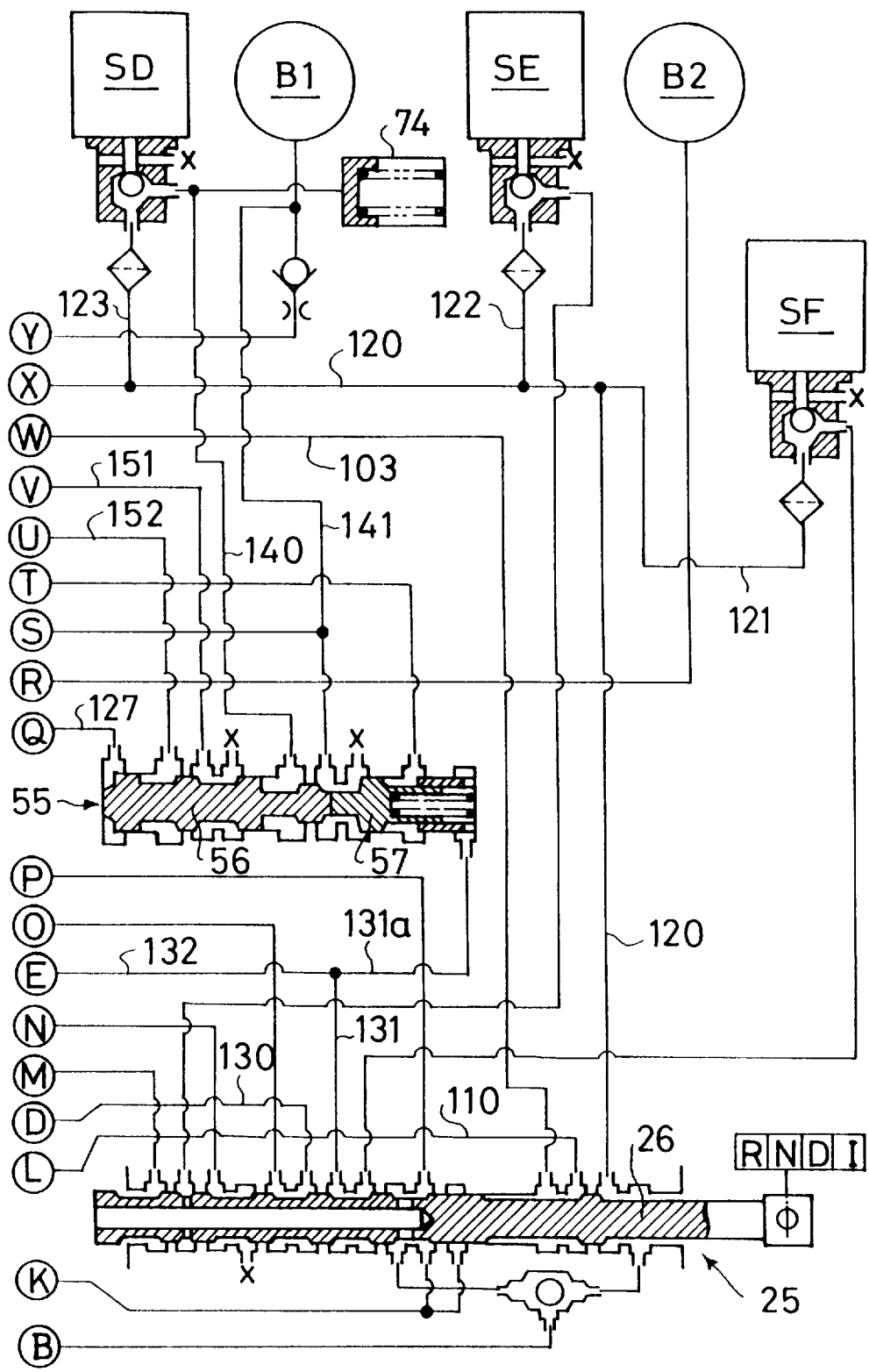
FIG. 4 is yet another partial hydraulic circuit diagram showing components of the shift control apparatus.

With reference to FIGS. 2, 3 and 4, a control apparatus for controlling engagement and disengagement of the first, second and third clutches CL1, CL2 and CL3 and the first and second brakes B1 and B2 will be described below. Each of the three drawings shows a respective portion of the control apparatus, composing a unified hydraulic circuit. Lines terminated with an identical alphabet (A~Y) in a circle in each drawing are continuous to each other, and lines marked with "X" are connected to a drain. This control apparatus is supplied with working oil by a hydraulic pump 10. This oil is first adjusted to a line pressure P1 by a regulator valve 20 and sent out through a line 100 as shown in the figures.

Besides this regulator valve 20, the control apparatus has a manual valve 25; six solenoid valves SA~SF; six hydraulic valves 30, 35, 40, 45, 50 and 55; and four accumulators 71, 72, 73 and 74. The manual valve 25 is connected to a shift lever at the driver's seat, and it is manually operated by the driver. The solenoid valves SA, SC and SF are normally-open type, so these valves are open while the solenoids are not energized. The solenoid valves SB, SD and SE are normally-close type, so these valves are closed while the solenoids are not energized.

In the following description, valves are each referred to as reducing valve 30, L-H shift valve 35, FWD pressure-switching valve 40, REV pressure-switching valve 45, delivery valve 50, and relief valve 55.

These hydraulic valves are actuated in response to the operation of the manual valve 25 and the solenoid valves SA~SF for the purpose of executing a shift control. Table 2 below shows the relation of the operation of the solenoid valves to the establishment of the speed ranges. "ON" and "OFF" in the table represent the turning on and off, respectively, of the solenoids. The operation of the solenoid valve SF is not shown in the table because it is not used for establishing a speed range but used only for increasing the line pressure when the reverse speed range is established.

TABLE 2

| Speed range | SOLENOID-OPERATED VALVE | | | | |
|---|---|---|---|---|---|
| | SA | SB | SC | SD | SE |
| | Type | | | | |
| | N/O | N/C | N/O | N/C | N/C |
| 1ST | OFF | OFF | ON | OFF | OFF (ON upon Engine braking) |
| 2ND | OFF | OFF | ON | ON | OFF (ON upon Engagement of L/C) |
| 3RD | OFF | OFF | OFF | OFF | OFF (ON upon Engagement of L/C) |
| 4TH | OFF | ON | ON | OFF | OFF (ON upon Engagement of L/C) |
| 5TH | ON | ON | OFF | OFF | OFF (ON upon Engagement of L/C) |
| REV | OFF | OFF | OFF | OFF | OFF |

N/O: Normally-open; N/C: Normally-closed; and L/C: Lockup clutch.

At first, description is given of a shift control which takes place when the D range (forward range) is selected with the shift lever moving a spool 26 in the manual valve 25 from position N, the position of the spool 26 shown in FIG. 4, to position D. When a hook on the right end of the spool 26 is positioned at "D", oil under the line pressure P1 is delivered to the manual valve 25 through lines 101 and 102 branched from the line 100 and then through a spool groove in the FWD pressure-switching valve 40 and a line 103. Then, the line pressure P1 is delivered through a groove on the spool 26 to lines 110 and 120. In this instance, the line 110 is closed off by the REV pressure-switching valve 45.

The oil under the line pressure P1 is then supplied from the line 120 to the solenoid valves SF, SE, SD, SB and SA through branched lines 121, 122, 123, 124 and 125, respectively. The line pressure P1 in the line 120 also acts on the right end of the L-H shift valve 35, moving a spool 36 thereof to the left. A line 126 branching from the line 120 is connected to the right end of the delivery valve 50, and a line 127 branching from the line 126 is connected to the left end of the relief valve 55, whereby spools 56 and 57 in the relief valve 55 are shifted to the right.

A line 103a branching from the line 103 is connected to the right end of the FWD pressure-switching valve 40 such that the line pressure P1 pushes a spool 41 in the FWD pressure-switching valve 40 to the left. The line pressure P1 is supplied to the left end of the FWD pressure-switching valve 40 through a line 104 branching from the line 103, through a groove on the spool 36 in the L-H shift valve 35, which has been shifted to the left, and then through a line 105. A line 106 branching from the line 104 is connected to the right end of the REV pressure-switching valve 45 such that a spool 46 in the REV pressure-switching valve 45 is kept shifted to the left by the line pressure P1.

A line 107 branching from the line 103 is connected to the solenoid valve SC, to supply the line pressure P1 thereto. In the above described ways, the line pressure P1 is supplied to each of the solenoid valves SA~SF, which are controlled to open or close for the purpose of controlling supply of the line pressure P1.

First, establishing the 1ST speed range is described. As the solenoid valve SF is not involved in establishing a forward range, only the solenoid valves SA~SE will be included in the description as shown in Table 2.

With reference to Table 2, only the solenoid valve SC is turned on, and the other solenoid valves are turned off for the 1ST speed range. As a result, only the solenoid valve SA opens, and the other solenoid valves close. When the solenoid valve SA opens, the line pressure P1 is supplied from the line 125 to a line 130 and then to a line 131 through a groove on the spool 26 at position D of the manual valve 25.

A line 131a branching from the line 131 is connected to the right end of the relief valve 55 such that the line pressure P1 acts on the right end of the relief valve 55. Furthermore, the line pressure P1 is supplied to the first clutch CL1 through a line 132 branching from the line 131, whereby the first clutch CL1 is actuated for engagement, and pressure change which occurs in the first clutch CL1 is regulated by the first accumulator 71.

The second clutch CL2 is connected to the drain through the relief valve 55, whose spools 56 and 57 are shifted to the right, and through the solenoid valve SB. The third clutch CL3 is connected to the drain through the solenoid valve SC, and the first brake B1 is connected to the drain through the relief valve 55 and the solenoid valve SD. The second brake B2 is connected to the drain through the manual valve 25. Therefore, only the first clutch CL1 engages to establish the 1ST speed range.

Next, description is made of establishing the 2ND speed range. As shown in Table 2, the solenoid valve SD is turned on, and it opens. As a result, the line pressure P1 is supplied to the first brake B1 from the line 123 through a line 140 and the relief valve 55, whose spools 56 and 57 are shifted to the right, and through a line 141. Therefore, the first clutch CL1 and the first brake B1 engage to establish the 2ND speed range.

For establishing the 3RD speed range, the solenoid valve SC is turned off, and the solenoid valve SD is also turned off. Because the solenoid valve SD is returned to off, the first brake B1 is released. As the solenoid valve SC is turned off and opened, the line pressure P1 is supplied to the third clutch CL3 from the line 107 through a line 145. As a result, the third clutch CL3 engages to establish the 3RD speed range.

At the same time, the line pressure P1 acts on the left-hand portion of the delivery valve 50 through a line 146 branching from the line 145 and also acts on the right end of the relief valve 55 through a line 147 branching from the line 145.

For establishing the 4TH speed range, the solenoid valve SB is turned on, and the solenoid valve SC is also turned on.

As the solenoid valve SC is returned to on, the third clutch CL3 is released. As the solenoid valve SB opens, the line pressure P1 is supplied to the second clutch CL2 from the line 124 through lines 150 and 152 and a groove on the spool 56 shifted to the right in the relief valve 55 and through a line 151. As a result, the second clutch CL2 engages to establish the 4TH speed range.

For establishing the 5TH speed range, the solenoid valve SA is turned on, and the solenoid valve SC is turned off. As the solenoid valve SA is switched from off to on, the supply of the line pressure P1 to the line 130 is cut off, and the first clutch CL1 is connected to the drain through the solenoid valve SA. As a result, the first clutch CL1 is released. As the solenoid valve SC opens, the third clutch CL3 engages as described previously. As a result, the 5TH speed range is established.

Figure 5:
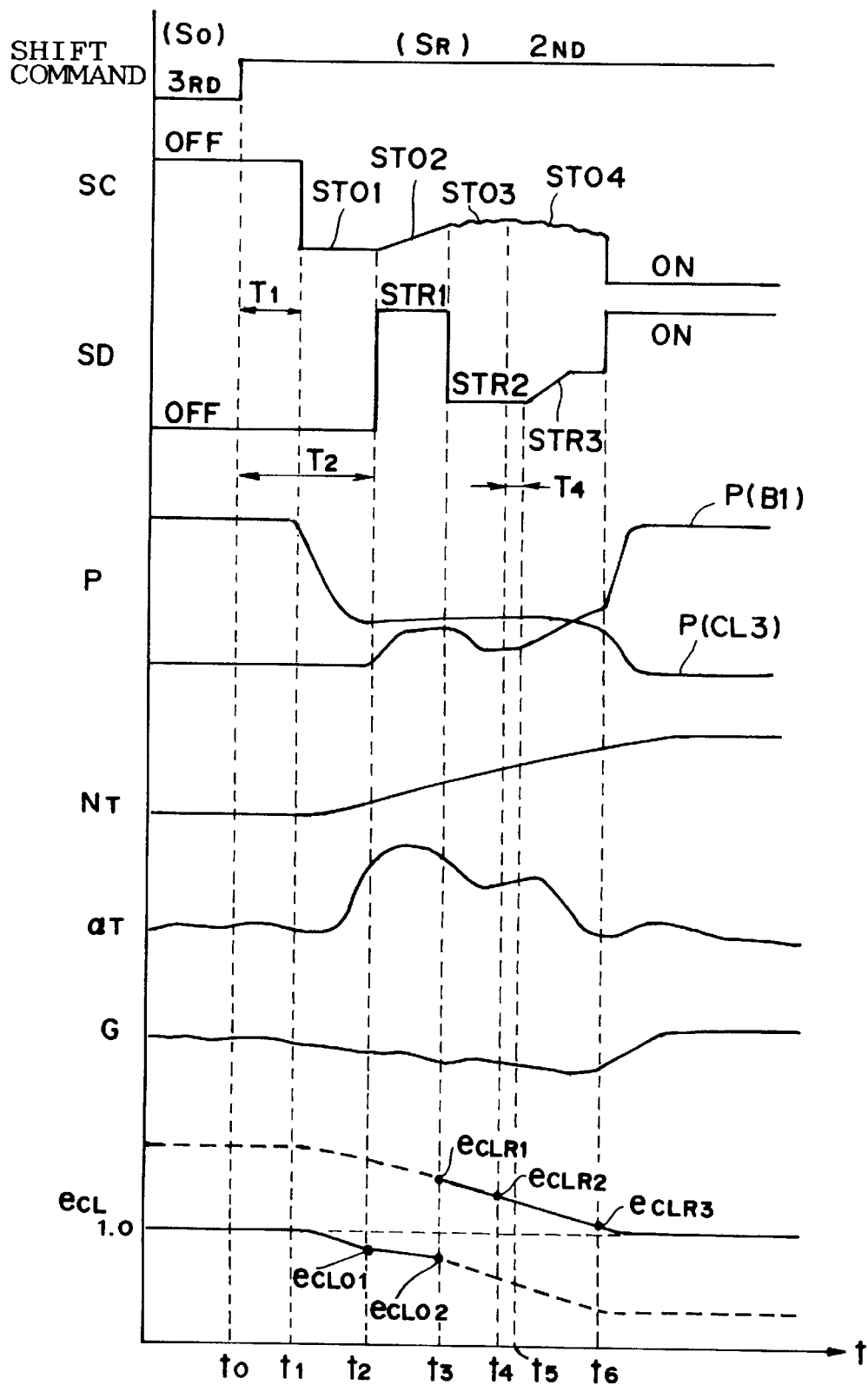
FIG. 5 is a chart showing chronological changes in various parameters during a power-on shift-down control of the shift control method.

The clutches and brakes are controlled for engagement and disengagement in the manner described above. Now, an engagement control for a shift-down operation which is carried out by a method according to the present invention is described with reference to a timing chart shown in FIG. 5 and flowcharts shown in FIGS. 6 through 8.

Figure 6:
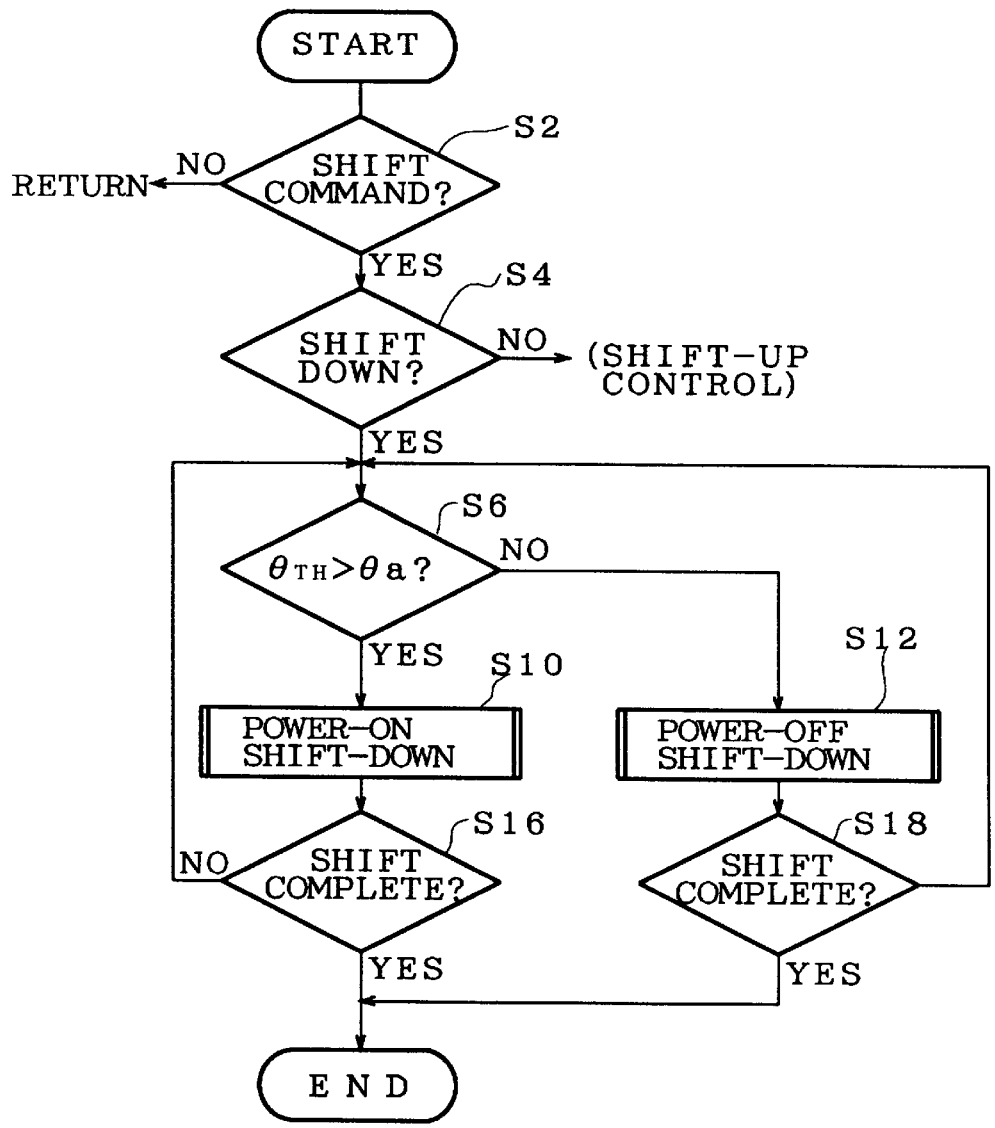
FIG. 6 is a flowchart showing processes of the shift control method.

As shown in the flowchart of FIG. 6, determination is made whether a shift command is generated or not at step S2. If a shift command is detected, then determination is made whether it is a shift-down command or not at step S4. If it is a shift-down command, then the control flow proceeds to step S6. There, determination is made whether the throttle opening θTH is greater than a predetermined value θa or not. If it is judged θTH>θa, then the control flow proceeds to step S10 for execution of a power-on shift-down control. On the other hand, if it is judged θTH≦θa, then it proceeds to step S12 for execution of a power-off shift-down control. After the shift operation is judged complete, either control finishes at step S16 or S18.

Figure 7:
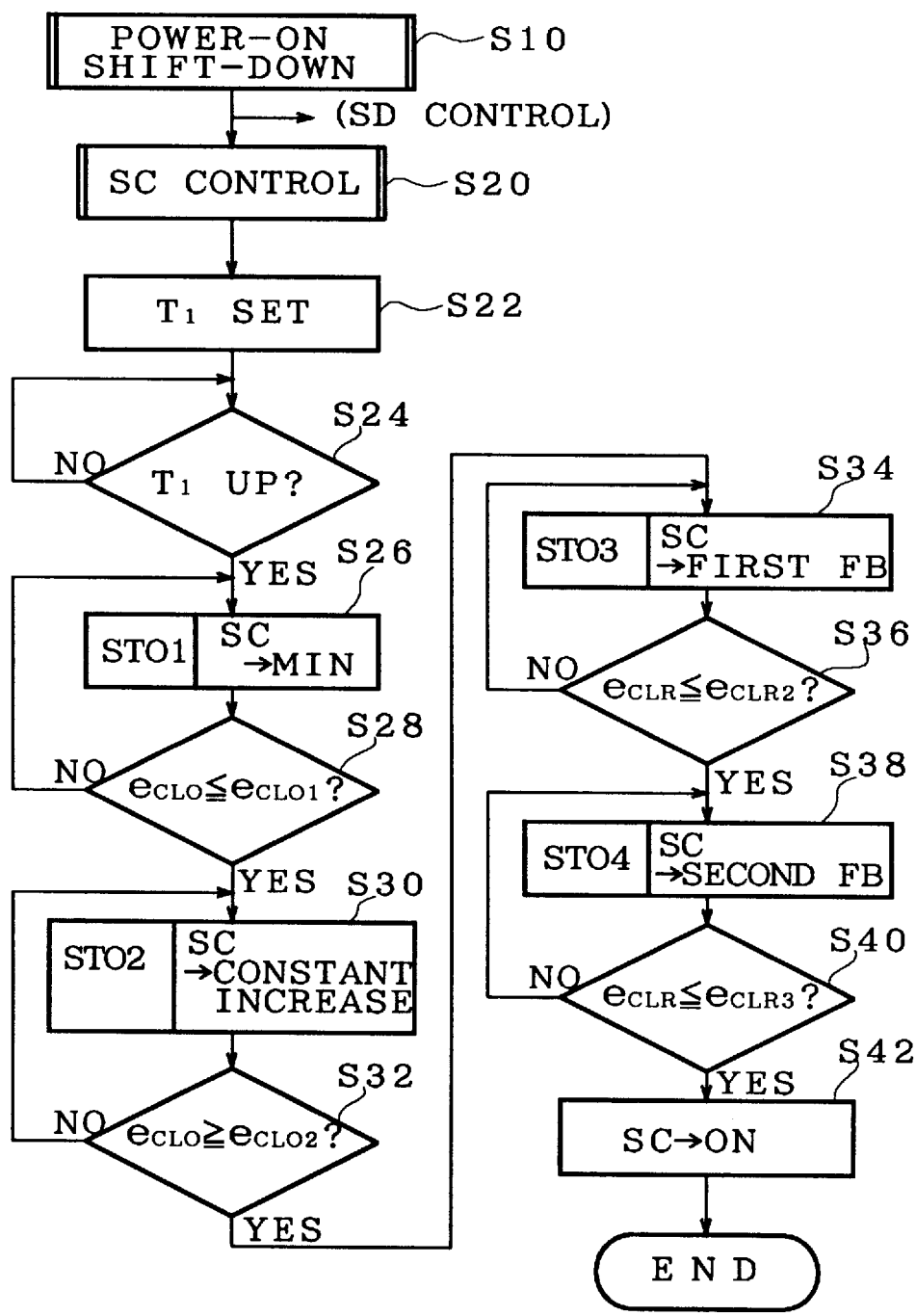
FIG. 7 is another flowchart showing processes of the shift control method.
Figure 8:
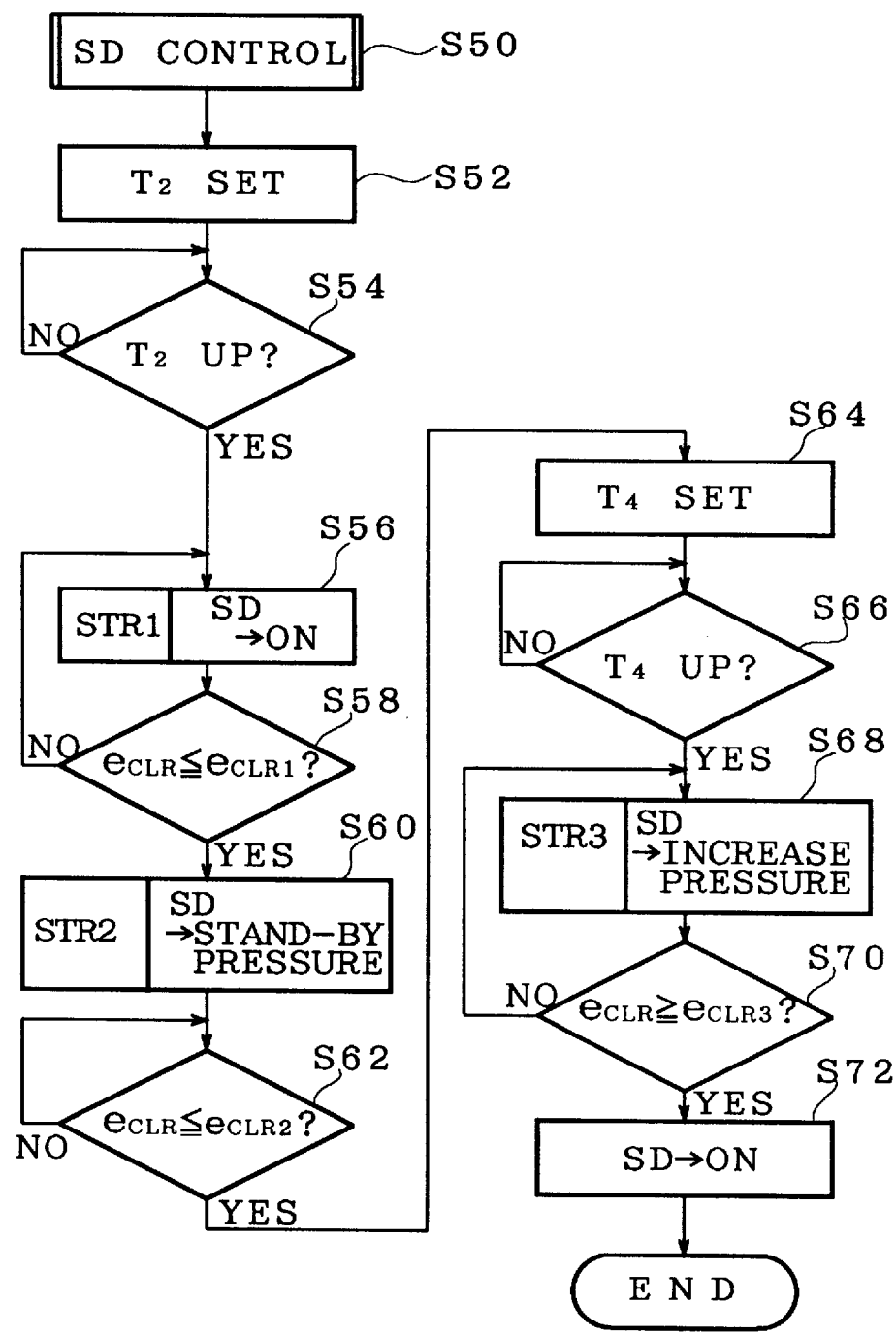
FIG. 8 is yet another flowchart showing processes of the shift control method.

The power-on shift-down control is carried out in accordance with the processes described in the flowcharts of FIGS. 7 and 8. Here, a description is made for a case in which a shift-down command from the 3RD speed range to the 2ND speed range is generated at time t0 as shown in the timing chart. In this timing chart, also shown are chronological changes in the engagement actuation pressures P(CL3) and P(B1) of the third clutch CL3 and the first brake B1, the turbine rotational speed NT of the torque convertor, the acceleration αT of the turbine and the acceleration G of the vehicle.

In this power-on shift-down control, the solenoid valve SC establishing the 3RD speed range (off-going speed range) and the solenoid valve SD to establish the 2ND speed range (on-coming speed range) are controlled. Signals for setting the solenoid valves SD and SC on or off and their duty cycles are referred to as "pressure command signals" in the claims, and they are indicated in the timing chart as SC and SD. The solenoid valve SC is of a normally open type, so it fully opens when its solenoid is turned off.

On the other hand, the solenoid valve SD is of a normally close type, so it fully opens when its solenoid is turned on.

FIG. 7 shows a control flow for the solenoid valve SC (step S20), i.e., a flow of steps for controlling the actuation pressure of the off-going engaging element. Here, immediately after a shift-down command is generated, counting starts for a predetermined time period T1 at step S22. At the same time, in a control flow for the solenoid valve SD shown in FIG. 8, i.e., a flow of steps for controlling the actuation pressure of the on-coming engaging element, immediately after the shift-down command is generated, counting starts for a predetermined time period T2 (>T1) at step S52. In this instance, the rotational speed NT of the turbine tends to increase because of the power-on condition.

When the elapse of the predetermined time period T1 is determined at step S24 in the control flow for the solenoid SC (time t1), the control flow proceeds to step S26 to start an off-going range releasing stage STO1. During this off-going range releasing stage STO1, the solenoid valve SC is controlled at a duty cycle which is approaching the ON condition as shown in the timing chart. As a result, the solenoid valve SC attains a very small opening. The engagement actuation pressure P(CL3) of the third clutch CL3, which has been in complete engagement, rapidly decreases to a releasing pressure, i.e., a minimum pressure. As the engaging force of the third clutch CL3 weakens rapidly, the clutch CL3 starts slipping. Thus, the rotational speed NT of the turbine increases gradually.

In the control apparatus, the input/output rotational speed ratio eCLO of the third clutch CL3 (off-going engaging element) and the input/output rotational speed ratio eCLR of the first brake B1 (on-coming engaging element) are calculated from the values detected by the input and output rotation sensors 9a and 9b and the gear ratio of the 2ND speed range. These input/output rotational speed ratios correspond to the rates of slippage of the off-going engaging element (third clutch CL3) and the on-coming engaging element (first brake B1). When the input/output rotational speed ratios are 1.0, the rates of slippage are zero.

As the third clutch CL3 starts slipping, the input/output rotational speed ratio eCLO of the off-going engaging element, i.e., the third clutch CL3, decreases gradually from 1.0 (i.e., the rate of slippage of the off-going engaging element increases gradually). When the input/output rotational speed ratio eCLO of the off-going engaging element is judged smaller than a first predetermined value eCLO1 at step S28 (i.e., the rate of slippage is judged to have increased to a first rate of slippage), the control flow proceeds to a torque-increasing stage STO2 (step S30), and the solenoid valve SC is controlled at a duty cycle in such a way that the engagement actuation pressure of the third clutch CL3 increases little by little, very gradually, from the releasing pressure.

On the other hand, when the elapse of the predetermined time period T2 is determined at step S54 in the control flow for the solenoid valve SD (time t2), the control flow proceeds to step S56 to start an on-coming range void-stroke-clearing stage STR1. During this on-coming range void-stroke-clearing stage STR1, the solenoid valve SD is turned on, and it opens fully as shown in the timing chart. As a result, the line pressure is rapidly supplied to the first brake B1, which has been in released condition, and the void stroke of the first brake B1 is quickly cleared. As seen from the timing chart, the predetermined time period T2 is set to a time at which the input/output rotational speed ratio eCLO of the off-going engaging element becomes smaller than the first predetermined value eCLO1 set for the off-going engaging element. Therefore, instead of judging the elapse of the predetermined time period T2, the on-coming range void-stroke-clearing stage STR1 at step S56 may be started when the input/output rotational speed ratio eCLO of the off-going engaging element becomes smaller than the first predetermined value eCLO1.

Then, when the input/output rotational speed ratio eCLO of the third clutch CL3, i.e., the off-going engaging element, is determined to have attained a second predetermined value eCLO2 set for the off-going engaging element at step S32

(time t3), the control flow for the solenoid valve SC proceeds to a first feedback stage STO3 at step S34. This stage is to detect the start of a change in the input/output rotational speed ratio eCLO of the third clutch CL3, which becomes rapidly small as the fist brake B1, after being cleared of its void stoke through the solenoid valve SD in the void-stroke-clearing stage STR1, starts engaging. That is to detect the completion of clearing the void stroke of the first brake B1 at step S32 and to move the control of the solenoid valve SC to the first feedback stage STO3. As such, the completion of clearing the void stroke may be judged from the determination whether or not the input/output rotational speed ratio eCLR of the first brake B1 has become smaller than a first predetermined value eCLR1 set for the on-coming engaging element.

Figure 9:
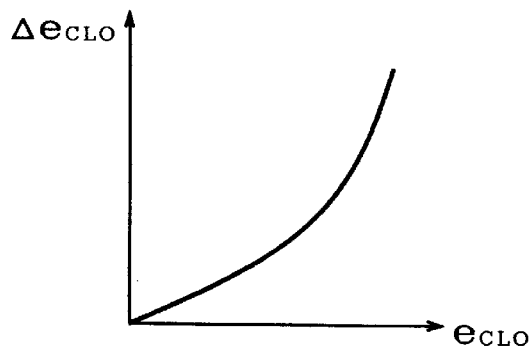
FIG. 9 is a graph showing the relation between the input/output rotational speed ratio and a target rate of change in the input/output rotational speed ratio of the off-going engaging element in the above mentioned control.

During the first feedback stage STO3, a target rate of change Δ eCLO is set for the input/output rotational speed ratio eCLO of the third clutch CL3, and the duty cycle of the solenoid valve SC is controlled in feedback to achieve this target rate of change Δ eCLO in the input/output rotational speed ratio. Relations between the input/output rotational speed ratio eCLO of the third clutch CL3 and the target rate of change Δ eCLO are preset as shown in FIG. 9.

On the other hand, when the input/output rotational speed ratio eCLR of the first brake B1 is judged smaller than the first predetermined value eCLR1, i.e., the void stroke clearing is determined complete, the control flow for the solenoid SD proceeds, from step S58 to step S60, to an on-coming range waiting stage STR2. During this on-coming range waiting stage STR2, the engagement actuation pressure of the first brake B1 is set to a pressure necessary for the brake to be in stand-by before starting engagement, i.e., to a pressure a little lower than a pressure to start engagement (hereinafter this pressure is referred to as "imminent stand-by pressure").

When the input/output rotational speed ratio eCLR of the first brake B1 becomes a second predetermined value eCLR2 set for the on-coming engaging element, the control flow proceeds, from step S36 to step S38, to a second feedback stage STO4. During this stage, the solenoid valve SC is controlled in feedback to achieve a target value which is set to the target rate of change A eCLO of the input/output rotational speed ratio achieved during the first feedback stage STO3 just before the control flow proceeded to the second feedback stage STO4.

On the other hand, in the control flow for the solenoid valve SD, when the input/output rotational speed ratio eCLR of the first brake B1 is determined to have become the second predetermined value eCLR set for the on-coming engaging element at step S62, after waiting for the elapse of a fourth predetermined time period T4 at steps S64 and S66, the control flow proceeds to an on-coming range engaging stage STR3 at step S68. During this on-coming range engaging stage STR3, the pressure of the first brake B1 is controlled so as to increase gradually from the imminent stand-by pressure to a predetermined pressure. As a result, the first brake B1, which has been in stand-by condition, waiting for engagement, starts engaging gradually.

When the input/output rotational speed ratio eCLR of the first brake B1 becomes a third predetermined value eCLR3 set for the on-coming engaging element, i.e., a value which corresponds to a rate of slippage set for engagement determination, the control flow for the solenoid valve SC proceeds from step S40 to step S42 to turn the solenoid valve SC on, and the control flow for the solenoid valve SD proceeds from step S70 to step S72 to turn the solenoid valve SD on also. As a result, the first brake B1 engages completely, and the third clutch CL3 is released completely.

In this way, the power-on shift-down operation from the 3RD speed range to the 2ND speed range is carried out by releasing the third clutch CL3 and engaging the first brake B1. In the above control, the off-going engaging element, i.e., the third clutch CL3, is released in such a way that the the rate of slippage is controlled in feedback to a predetermined target value. Therefore, the release is carried out at an appropriate speed, and the shift operation is smoothly carried out without any engine racing, and the engagement of the on-coming engaging element starts without a shift shock. Furthermore, the on-coming engaging element, after being completely cleared of the void stroke, waits in stand-by condition prior to engagement and then engages gradually as the rate of slippage decreases, and it engages completely when the rate of slippage becomes nil. As such, the on-coming engaging element is smoothly engaged.

Figure 10:
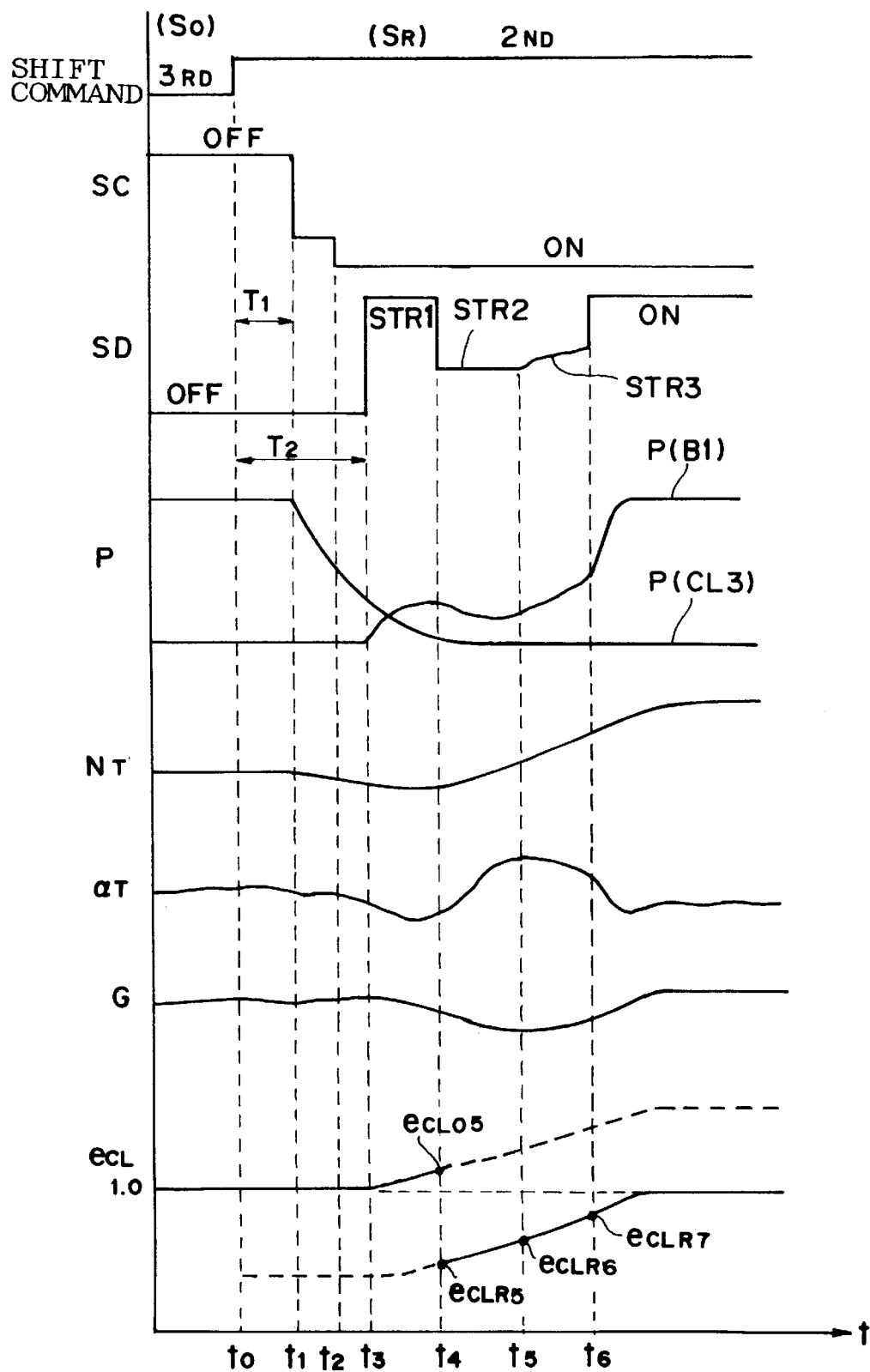
FIG. 10 is a chart showing chronological changes in various parameters during a power-off shift-down control of the shift control method.

Now, a power-off shift-down control (step S12) is described with reference to FIG. 10 through FIG. 12. The timing chart in FIG. 10 shows changes in various parameters during a power-off shift-down control, which is carried out in a power-off condition. In this timing chart, the accelerator pedal is returned at time t2 after a power-on shift-down command is generated at time t0.

As shown in FIG. 6, the power-on shift-down control switches to the power-off shift-down control at time t2 when θTH≦θa is achieved in the throttle opening. This shift-down control is explained also for a case of shift operation from the 3RD speed range to the 2ND speed range. Therefore, the controls of the solenoid valves SC and SD are described also with reference to the timing chart and flowcharts.

Figure 11:
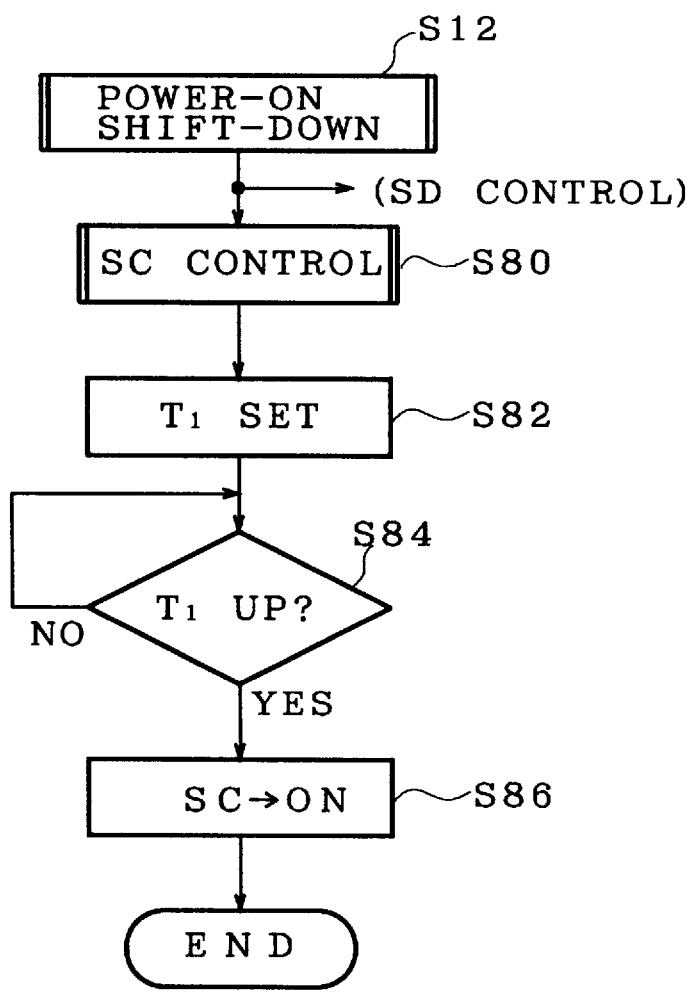
FIG. 11 is a flowchart showing processes of the shift control method.

As shown in FIG. 11, a control flow (step S80) for the solenoid valve SC, which controls the third clutch CL3, waits at steps S82 and S84 for the predetermined time period T1 to elapse. The counting of this predetermined time period T1 started at the generation of the shift command at step S2 and continues without being reset even when the condition changes from power-on to power-off. In this example, as shown in the timing chart of FIG. 10, the predetermined time period T1 elapses at time t1, so the control flow for the solenoid valve SC proceeds to step S86 to turn the solenoid valve SC on, thereby releasing the pressure in the third clutch CL3 completely.

Figure 12:
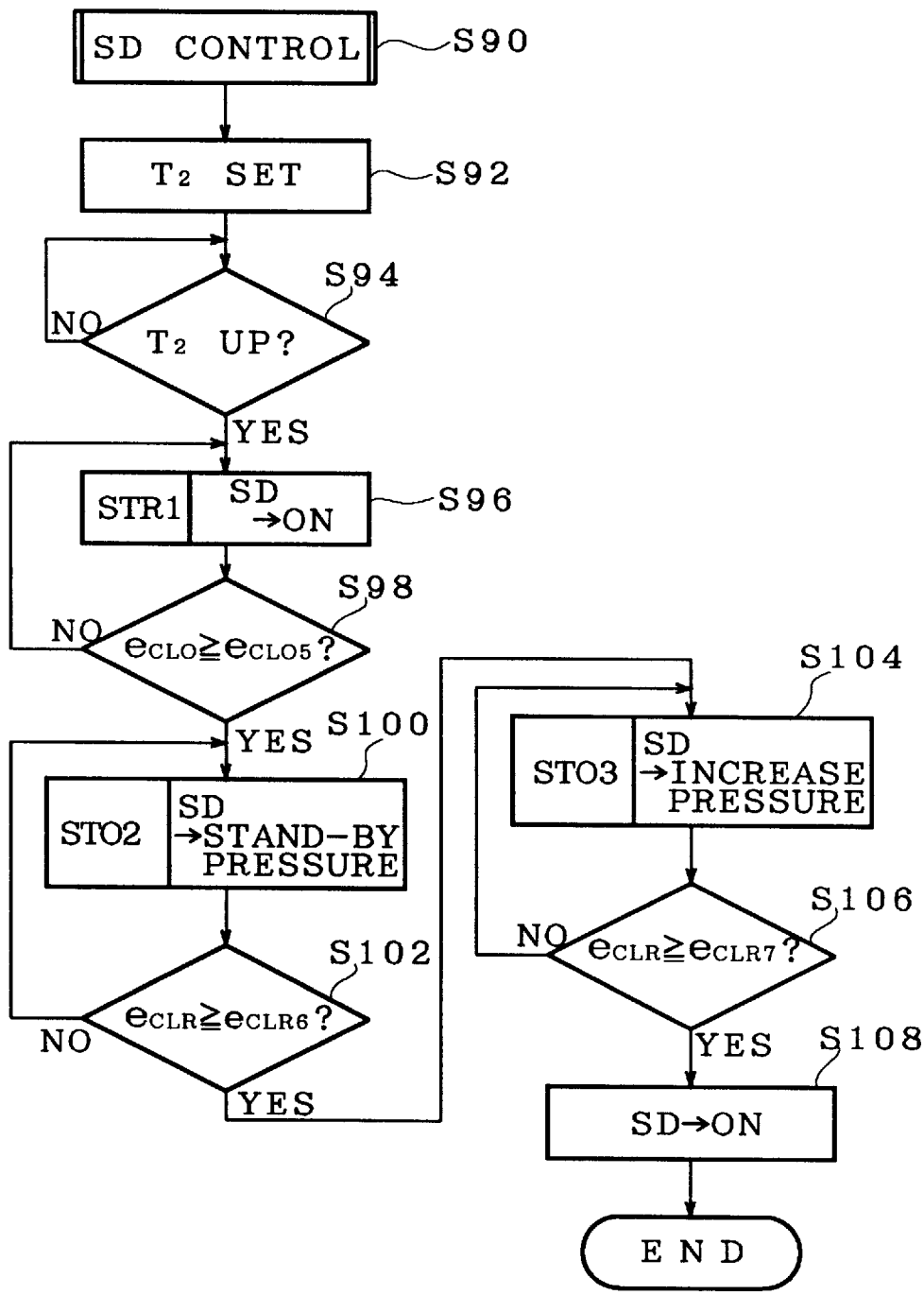
FIG. 12 is another flowchart showing processes of the shift control method.

On the other hand, as shown in FIG. 12, the control flow (step S90) for the solenoid valve SD waits at steps S92 and S94 for the predetermined time period T2 to elapse. This predetermined time period T2 is a time elapsed also from the generation of the shift command at step S2. When the predetermined time period T2 elapses at time t3, the control flow proceeds to step S96 to start the on-coming range void-stroke clearing stage STR1. This control stage is exactly the same as the on-coming range void-stroke clearing stage STR1 of the power-on shift-down control, so no explanation is given here.

As the first brake B1, i.e., the on-coming engaging element, after being cleared of the void stroke, starts engaging, the input/output rotational speed ratios of the off-going engaging element and the on-coming engaging element change rapidly. Therefore, the completion of the void stroke clearing is determined from these changes. Specifically, when the input/output rotational speed ratio eCLO of the third clutch CL3, i.e., the off-going engaging element, is determined at step S98 to have become greater than a fifth predetermined value eCLO5 set for the off-going engaging element, the void stroke clearing is judged complete. Then, the control flow proceeds to step S100 to generate a pressure command signal which sets the engagement actuation pressure to a pressure with which the first brake B1 engages to a certain degree (referred to as "engagement stand-by pressure").

In this way, the third clutch CL3 is released, and the first brake B1 starts engaging. As a result, the input/output rotational speed ratio of the first brake B1 approaches 1.0, i.e., the rate of slippage approaches zero. When the input/output rotational speed ratio eCLR of the first brake B1 becomes greater than a sixth predetermined value eCLR6, the control flow moves from step S102 to step S104 to increase the engagement actuation pressure gradually from the above mentioned engagement stand-by pressure to a predetermined pressure.

Then, when the input/output rotational speed ratio eCLR of the first brake B1 becomes greater than a seventh predetermined value eCLR7, the control flow moves from step S106 to step S108 to turn the solenoid valve SD on, completing this shift operation.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shift control method for an automatic transmission, said method comprising the steps of:

providing a plurality of power transmission paths between input and output members, a plurality of engaging elements for selectively establishing said power transmission paths, and an engagement-controlling means for controlling engagement actuation pressures of the engaging elements in response to pressure command signals, the engagement-controlling means carrying out a shift-down control from and off-going range to an on-coming range by releasing an off-going engaging element and engaging an on-coming engaging element among the plurality of engaging elements in response to a shift-down command;

generating a pressure command signal in an off-going range releasing stage which quickly lowers the engagement actuation pressure of the off-going engaging element to an engagement-releasing pressure;

generating a pressure command signal in an off-going range controlling stage which sets the engagement actuation pressure of the off-going engaging element to a pressure which is slightly higher than said engagement-releasing pressure;

generating a pressure command signal in an on-coming range void-stroke-clearing stage which sets the engagement actuation pressure of the on-coming engaging element to a predetermined high-pressure necessary for clearing a void stroke;

generating a pressure command signal in an on-coming range waiting stage which sets the engagement actuation pressure of said on-coming engaging element to a stand-by pressure necessary for retaining said on-coming engaging element in stand-by condition prior to engagement;

generating a pressure command signal in an off-going range final stage which releases said off-going engaging element completely;

generating a pressure command signal in an on-coming range final stage which engages said on-coming engaging element completely;

wherein control of said off-going engaging element based on said off-going range releasing stage is started after said shift-down command is generated, control of said off-going engaging element based on said off-going range controlling stage as well as control of said on-coming engaging element based on said on-coming range void-stroke-clearing stage are started when the rate of slippage of said off-going engaging element increases to a first rate or slippage set for said off-going engaging element, control of said on-coming engaging element based on said on-coming range waiting stage is executed when the rate of slippage of said off-going engaging element increases to a second rate of slippage set for said off-going engaging element, and wherein control of said off-going engaging element based on said off-going range final stage and control of said on-coming engaging element based on said on-coming range final stage are executed when the rate of slippage of said on-coming engaging element decreases to the slippage rate for engagement determination, said slippage rate for engagement determination having an approximately zero rate.

2. The shift control method as set forth in claim 1, further comprising a step of calculating said rate of slippage from an input/output rotational speed ratio of each engaging element.

3. The shift control method as set forth in claim 1, wherein the control of said off-going engaging element based on said off-going range releasing stage is started after a first predetermined time period T1 has elapsed since generation of said shift-down command.

4. The shift control method as set forth in claim 1 wherein said off-going range controlling stage comprises the steps of:

increasing the engagement actuation pressure of said off-going engaging element from said engagement-releasing pressure in a torque increasing stage;

controlling the engagement actuation pressure of said off-going engaging element in a feedback stage to match a rate of slippage increase of said off-going engaging element to a target rate of slippage increase which is set in correspondence with the rate of slippage of said off-going engaging element in such a way that if the rate or slippage is large, the target rate of slippage increase is set to be large;

wherein control of said off-going engaging element based on said torque-increasing stage is executed when the rate of slippage of said off-going engaging element increases to the first rate of slippage set for said off-going engaging element, and wherein control of said off-going engaging element based on said feedback stage is executed when the rate of slippage of said off-going engaging element changes to the second rate of slippage set for said off-going engaging element.

5. The shift control method as set forth in claim 4 wherein said feedback stage includes a second feedback stage which includes a step of controlling the engagement actuation pressure of said off-going engaging element to achieve a constant rate or slippage increase which is the target rate of slippage increase set in constant, and wherein control of said off-going engaging element is switched to a control based on said second feedback stage when the rate of slippage of said on-coming engaging element decreases to a rate of slippage set for switching determination.

6. The shift control method as set forth in claim 1, further comprising the steps of:

increasing the engagement actuation pressure of said on-coming engaging element in an on-coming range engaging stage gradually from said stand-by pressure to a medium engagement pressure; and switching control of said on-coming engaging element to a control based on said on-coming range engaging stage when the rate of slippage of said oncoming engaging element decreases to a rate of slippage set for switching determination during the control of said on-coming engaging element based on said first on-coming range waiting stage.

7. The shift control method as set forth in claim 6, further comprising a step of switching control of said on-coming engaging element to a control based on said on-coming range engaging stage when a second predetermined time period has elapsed since the rate of slippage of said on-coming engaging element had decreased to the rate of slippage set for switching determination.

8. A shift control method for an automatic transmission, said method comprising the steps of:

providing a plurality of power transmission paths between input and output members a plurality of engaging elements for selectively establishing said power transmission paths, and an engagement-controlling means for controlling engagement actuation pressures of the engaging elements in response to pressure command signals, the engagement-controlling means carrying out a shift-down control from and off-going range to an oncoming range by releasing an off-going engaging element and engaging an on-coming engaging element among the plurality of engaging elements in response to a shift-down command;

generating a pressure command signal in an off-going range releasing stage which quickly lowers the engagement actuation pressure of the off-going engaging element to an engagement-releasing pressure;

generating a pressure command signal in an off-going range controlling stage which sets the engagement actuation pressure of the off-going engaging element to a pressure which is slightly higher than said engagement-releasing pressure;

generating a pressure command signal in on-coming range void-stroke-clearing stage which sets the engagement actuation pressure of the on-coming engaging element to a predetermined high-pressure necessary for clearing a void stroke;

generating a pressure command signal in an on-coming range waiting stage which sets the engagement actuation pressure of said on-coming engaging element to a stand-by pressure necessary for retaining said on-coming engaging element in stand-by condition prior to engagement;

generating a pressure command signal in an off-going range final stage which releases said off-going engaging element completely;

generating a pressure command signal in an on-coming range final stage which engages said on-coming engaging element completely;

wherein control of said off-going engaging element based on said off-going range releasing stage is started after said shift-down command is generated, control of said off-going engaging element based on said off-going range controlling stage as well as control of said on-coming engaging element based on said on-coming range void-stroke-clearing stage are started when an elapsed time since the generation of the shift-down command reaches a predetermined time period T2, control of said on-coming engaging element based on said on-coming range waiting stage is executed when the rate of slippage of said off-going engaging element increases to a second rate of slippage set for said off-going engaging element, and wherein control of said off-going engaging element based on said off-going range final stage and control of said on-coming engaging element based on said on-coming range final stage are executed when the rate of slippage of said on-coming engaging element decreases to the slippage rate for engagement determination, said slippage rate for engagement determination having an approximately zero rate.

9. A shift control method for an automatic transmission, said method comprising the steps of:

providing a plurality of power transmission paths between input and output members a plurality of engaging elements for selectively establishing said power transmission paths, and an engagement-controlling means for controlling engagement actuation pressures of the engaging elements in response to pressure command signals, the engagement-controlling means carrying out a shift-down control from and off-going range to an oncoming range by releasing an off-going engaging element and engaging an on-coming engaging element among the plurality of engaging elements in response to a shift-down command;

generating a pressure command signal in an off-going range releasing stage which quickly lowers the engagement actuation pressure of said off-going engaging element to an engagement-releasing pressure;

generating a pressure command signal in an on-coming range void-stroke-clearing stage which sets the engagement actuation pressure of said on-coming engaging element to a predetermined high-pressure necessary for clearing a void stroke;

generating a pressure command signal in a on-coming range waiting stage which sets the engagement actuation pressure of said on-coming engaging element to an engagement pressure set correspondingly to an input torque;

generating a pressure command signal in an on-coming range final stage which engages said on-coming engaging element completely;

wherein control of said off-going engaging element based on said off-going range releasing stage is started after said shift-down command is generated;

control of said on-coming engaging element based on said on-coming range void-stroke-clearing stage is started when a predetermined time period T2 has elapsed since the generation of said shift-down command;

control of said on-coming engaging element based on said on-coming range waiting stage is executed when the rate of slippage of said off-going engaging element increases to a predetermined rate of slippage set for said off-going engaging element; and control of said on-coming engaging element based on said on-coming range final stage are executed when the rate of slippage of said on-coming engaging element decreases to the slippage rate set for engagement determination, which is almost zero.

10. The shift control method as set forth in claim 9, further comprising the steps of increasing the engagement actuation pressure of said on-coming engaging element gradually from the stand-by pressure in an on-coming range engaging stage; and switching control of said on-coming engaging element to a control based on said on-coming range engaging stage when the rate of slippage of said oncoming engaging element decreases to a rate of slippage set for switching determination during the control of said on-coming engaging element based on said on-coming range waiting stage.

\* \* \* \* \*